March 28, 1944.    H. ZIEBOLZ    2,345,523
FLOW PROPORTIONING APPARATUS
Filed July 31, 1941
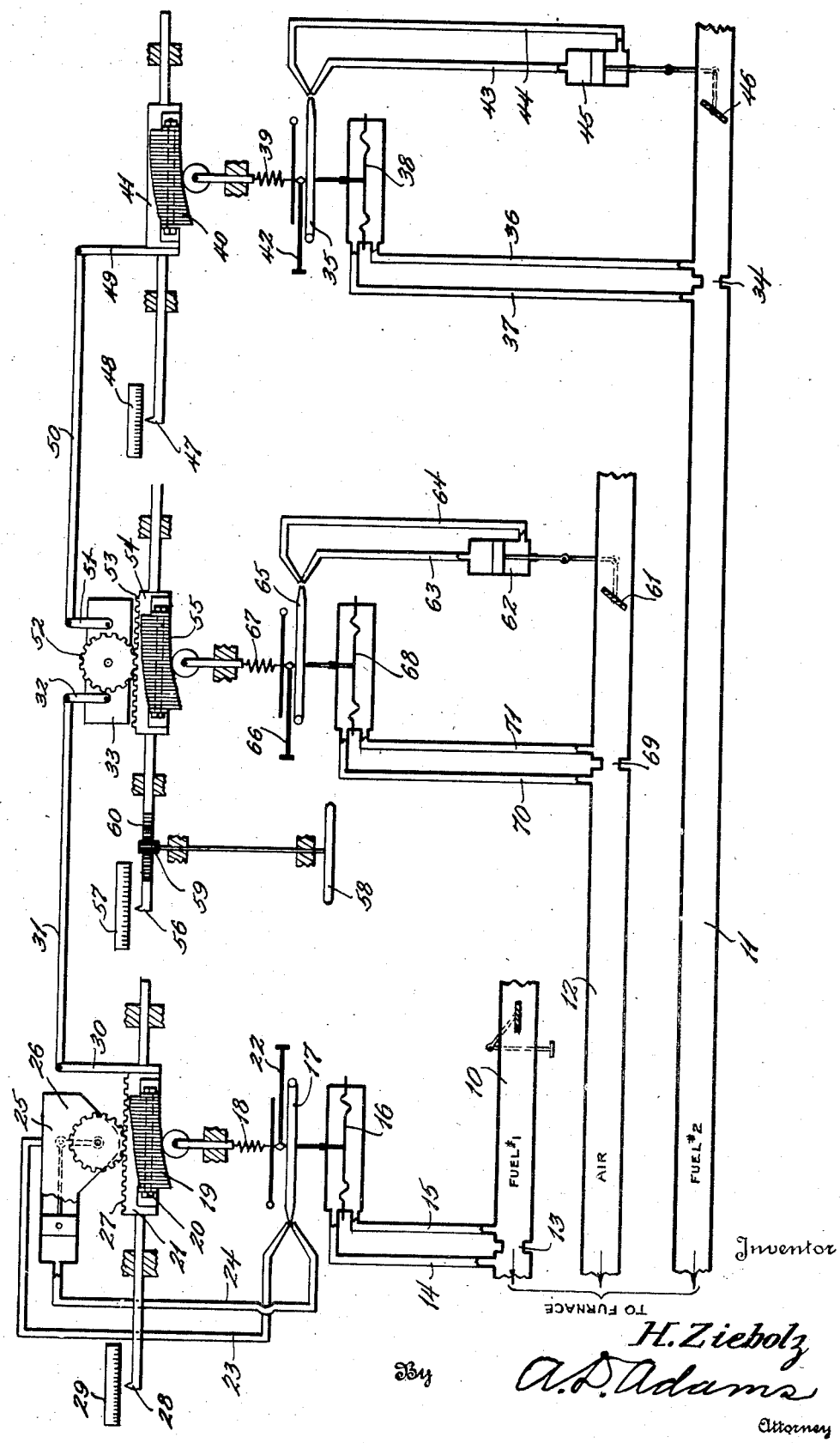
Inventor
H. Ziebolz
By A. D. Adams
Attorney Patented Mar. 28, 1944

2,345,523

UNITED STATES PATENT OFFICE 2,345,523

FLOW PROPORTIONING APPARATUS

Herbert Ziebolz, Chicago, Ill., assignor to Askania Regulator Company, Chicago, Ill., a corporation of Illinois Application July 31, 1941, Serial No. 404,910

8 Claims. (Cl. 137—164)

This invention relates to improved apparatus for proportioning the flow of at least two separate fuels having different heating values to the total supply of combustion supporting air delivered to a furnace in which a definite heat input is desired and the flow of the primary fuel varies. The main idea is to provide improved summarizing and proportioning means, including means for manually controlling the total supply of air and automatically maintaining the adjusted flow constant in accordance with any desired heat input of a furnace, whereby the secondary fuel will be varied automatically in response to any changes in the flow of the primary fuel. Heretofore, it has been suggested that rates of fuel flow be summarized by means of fuel flow meters or by pilot air flows which are directly proportional to the individual B. t. u. rates of fuel flow and the total air proportioned to the sum of the individual fuel flows in terms of their heating values. The design of such mechanisms is based on the fact that a definite amount of air is required for theoretically complete combustion of a given quantity of fuel in terms of its B. t. u. value. In the operation of industrial furnaces or boiler furnaces a number of factors must be taken into consideration which render the supply of the calculated or exact amount of air necessary for theoretically complete combustion, improper. Such factors do not vary as a direct function of the rate of fuel flow but present different values at different rates of fuel flow. Some of these factors are, for example, air used to atomize liquid fuels or primary air used for conveying pulverized fuel, which air is not subject to control by the well known air control apparatus. Such factors are known as "burner factors." The calculated amount of air, which would be supplied by the control apparatus to support theoretically complete combustion of a single fuel, modified by the amount of air which finds its way into the burner installation by reason of these factors, is referred to herein as "compensated air requirements" of that fuel. If more than one fuel is supplied, the calculated amount of air which would be supplied by the control apparatus to support theoretically complete combustion of the plurality of fuels, modified by the amount of air which finds its way into the burner installation, as a result of the feeding of more than one fuel, is referred to herein as "totalized compensated air requirements" for the fuels. Further correction factors may be necessary in any furnace installation to take into account infiltration of air into the furnace, other sources of air of determinable amounts admitted to the furnace, or the desired condition of the furnace atmosphere. All of these factors are subject to variations which are not direct functions of the rate of total fuel supply. They may be termed furnace factors. These furnace factors may require further adjustment in the "total compensated air requirements" called for by the fuels. The total compensated air requirements, thus modified by these furnace factors, is herein termed "adjusted total air requirements."

The "adjusted total air requirements" may be modified so as to produce a deficiency or excess of combustion air in the furnace. The "adjusted total air requirements," as thus modified, may be termed "adjusted total controlled air" or the actual amount of controlled air supplied to the furnace.

A further and more specific aim of the invention is to provide improved, automatic proportioning means for controlling the flows of the primary and secondary fuels in accordance with predetermined total supplies of air, taking into account variations in the flow or available supply of the primary fuel and the compensated air requirements necessary to support complete combustion of the respective fuels. Another aim is to use the secondary fuel as a make-up fuel and to vary its supply in accordance with variations in the available supply of primary fuel.

This invention involves certain improvements over my copending application Ser. No. 401,666, filed July 9, 1941.

Other aims and advantages of the invention will appear in the specification, when considered in connection with the accompanying drawing, wherein the figure is a diagrammatic illustration of one form of apparatus embodying the invention and applied to the control of air and two fluid fuels.

Referring particularly to the drawing, the control mechanism is shown as being applied to control the amount of secondary fuel in response to variations in flow of primary fuel and in proportion to the adjusted total air requirements of both fuels. The fuels are adapted to flow through individual conduits 10 and 11 and the controlled combustion air is supplied for both fuels through a single conduit 12, all leading to a furnace, not shown. The primary fuel, for example, may be coke oven gas, the supply of which varies and is limited, and the secondary fuel may be natural gas, the supply of which is unlimited. The idea is to use all of the available primary fuel because of its relatively low cost and to make up the difference to supply the heat demand with the more expensive secondary fuel.

The conduit 10 is shown as having a constriction 13 on the opposite sides of which are connected a pair of pipes 14 and 15 leading to opposite sides of a diaphragm 16 connected to act on one side of a pivoted jet pipe 17 of a differential pressure operated flow responsive device of a well known type. The force exerted by the diaphragm acts in opposition to a spring 18, the compression of which is controlled by a cam 19 of variable contour. The cam is shown as being composed of a multiplicity of relatively adjustable, slotted pieces clamped together by a bolt 20 and secured to a carriage 21 which is slidably mounted in fixed bearings. The shape of this cam is adjusted to take into account the variable burner factors, so that its movements are directly proportional to the compensated air requirements necessary to support complete combustion of the primary fuel. In the present example, its contour differs from that of an ordinary square root cam.

The flow responsive device has a ratio slider 22 which may be employed to vary the ratio of compensated air requirements for the particular fuel to the flow of the fuel in accordance with variations in the density, chemical analysis and viscosity of the fuel, as well as other factors. The force exerted on the jet pipe by the diaphragm, due to the differential pressure on opposite sides of the constriction 13, is always counterbalanced by the force of the spring to restore the jet pipe to neutral position.

The jet pipe is shown as delivering fluid to one or the other of two conduits 23 and 24 connected to operate a servo-motor 25, which, in turn, operates a spur gear 26 meshing with a rack 27 on the carriage 21. The carriage is also shown as carrying a pointer 28 cooperating with a scale 29 reading in terms of the compensated air requirements of the primary fuel. The carriage or the cam is connected by means of an arm 30 and link 31 to a crank arm 32 mounted on one shaft of a differential gear 33. Such a differential gear is shown in detail in my aforesaid copending application.

The conduit 11 for the secondary fuel is also shown as having a constriction 34 across which differential pressure is created to operate the jet pipe 35 of a regulator through pipes 36 and 37 and a diaphragm 38 in the same manner as the jet pipe 17. The force exerted by the diaphragm on the jet pipe 35 is opposed by a spring 39 the compression of which is controlled by an adjustable cam 40 made of a plurality of pieces like the cam 19 and mounted on a carriage 41 which is slidably mounted in fixed bearings. The contour of this cam is likewise adjusted to take into account the variable secondary burner factors so that its adjusted movements are directly proportional to the compensated air requirements necessary to support complete combustion of the secondary fuel. The contour also deviates from that of an ordinary square root cam. This regulator also has a ratio slider 42 adapted to change the percentage or ratio of the compensated quantity of air to that of the fuel. Thus, both ratio sliders 22 and 42 permit the introduction of correction factors which take into account variations in the chemical analysis, viscosity changes, density changes of the fuels. The jet pipe acts through a pair of pipes 43 and 44 on the piston of a servo-motor 45 which is connected to control the position of a butterfly valve 46 in the fuel conduit 11. The carriage 41 is also shown as operating a pointer 47 cooperating with a scale 48 which is calibrated in terms of the compensated air requirements for the secondary fuel at its varying rates of flow.

The carriage 41 is likewise connected to the differential gear 33 by means of an arm 49 and link 50 through a second crank arm 51 on a second shaft of the differential gear. As explained in the aforesaid application, the differential gear has a spur gear 52, which meshes with a rack 53 on a slidable carriage 54 similar to the carriage 21. The carriage 54 also carries an adjustable cam 55, made like cams 19 and 40, so shaped as to control the supply of air in accordance with its adjusted position, taking into account air infiltration into the furnace. Its contour also differs from that of a square root cam so that its adjusted movements are always proportional to the adjusted total air requirements of both fuels throughout the range of its adjustments. The carriage operates a pointer 56 cooperating with a scale 57 to indicate the adjusted total air requirements, representing the desired heat input. The carriage 54 is adapted to be adjusted longitudinally by any suitable means, such as a hand wheel 58, operating a pinion 59 meshing with a rack 60 connected to the carriage. It will be seen that the adjusting movement imparted to the carriage and, through it, to the differential gear 33 is the sum of the movements imparted to the separate cams 19 and 40 by the differential gear.

Now, the flow of air in conduit 12 is shown as being controlled by a butterfly valve 61 which is actuated by a piston type servo-motor 62. The servo-motor is connected by pipes 63 and 64 to be operated by a jet pipe regulator 65 also having a ratio slider 66, whereby the air ratio may be changed at will. The cam 55 acts on one side of the jet pipe through a spring 67 and changes the setting of the regulator to control the air flow through the conduit 12. The spring acts on the jet pipe in opposition to a diaphragm 68 on the opposite side of the jet pipe, and the position of the diaphragm is controlled by the pressure differential across a constriction 69 in the air conduit 12 acting through pipes 70 and 71 on opposite sides of the diaphragm.

In the operation of the apparatus, the hand wheel 58 is used to set the air cam 55 in terms of the adjusted total air requirements to maintain the desired heat input in the furnace. This adjustment imparts proportioning movements, through the differential gear 33, to the cams 19 and both of the cams 19 and 40 are moved simultaneously to an intermediate loading position. Then the cam 55 remains fixed in its adjusted position, due to friction of the parts. The cam 19 will change its position in response to changes in the flow of the primary fuel and its movements will impart controlling movements through the differential gearing to the control cam 40. As it is desirable to use all available ordinary fuel, regardless of flow variations, the flow of that fuel will determine the position of the carriage 21 through the operation of the regulator 17 and servo-motor 25. However, if the supply of primary fuel ever exceeds the heat demand, its flow can be restricted by an ordinary hand valve. Now, the carriage 54 carrying the cam 55, which has been adjusted to cause the regulator 65 to maintain a given flow of total air, holds the gear 52 stationary, so that, any movement imparted to the arm 31 by changes in the position of carriage 21, will be imparted through the differential gearing 33 to arm 51, link 50, etc., to cam 40. This movement will control the position of the jet pipe regulator 35, which, in turn, operates the valve 46 to vary the flow of secondary fuel in inverse proportion to the flow of the primary fuel.

It will be understood that the regulators, servo-motor and the cams may be mounted on any suitable support, such as a table. The stroke of the cams can be made the same for all controls by choosing the necessary gear ratio in the differential gearing and the cams may be guided for straight line movement in any convenient manner, for example, by wheeled carriages or the like. Moreover, the indicators may be either mechanical or electrical and all of them may be located at any convenient point.

It will be understood that the improved apparatus embodying the invention may be applied to the control of the combustion air for any number of fuels by using an additional differential gear for each additional fuel, as disclosed in the aforesaid copending application.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. Apparatus for controlling and proportioning the supply of a primary fuel and at least one secondary fuel to the adjusted total controlled supply of air for a furnace, wherein the flow of primary fuel varies, comprising, in combination, individual conduits for the air and the respective fuels; manually settable control means connected to the air conduit constructed and arranged to maintain the adjusted supply of controlled air constant in accordance with the desired heat conditions in the furnace; movement proportioning means, including differential gearing, connected to be operated by the adjustments of the manually settable means; flow responsive means connected to the primary fuel conduit, including a servo-motor operable in response to changes in the rate of flow of the primary fuel; a member operable by the servo-motor forming a part of the flow responsive means constructed and arranged to be moved from a zero position corresponding to zero flow of the fuel in proportion to the compensated air requirements necessary to support complete combustion of the primary fuel; means connecting said last named member to impart its movements to the differential gearing; and flow control means connected to the secondary fuel conduit having a member connected to be operated by the movements imparted through the differential gearing in response to variations in the flow of the primary fuel, said member being so constructed and arranged that its operation is such that it effects control of the secondary fuel to make up for deficiency in the primary fuel in the terms of the compensated air requirements of the secondary fuel.

2. Apparatus for controlling and proportioning the supply of a primary fuel and at least one secondary fuel to the adjusted total controlled supply of air for a furnace, wherein the flow of primary fuel varies, comprising, in combination, individual conduits for the air and the respective fuels; an automatic regulator connected to the air conduit constructed and arranged to maintain the supply constant; a manually movable adjusting member associated with said regulator to control the supply of air in accordance with the heat demand; movable proportioning means connected to be operated by said adjusting member; a flow responsive device connected to the primary fuel conduit embodying a movable element constructed and arranged to be operated in response to variations in the primary fuel flow, so that its movements are proportional to compensated air requirements of said primary fuel at its varying rates of flow; an actuating member connecting said movable element to said proportioning means; an automatic flow controlling regulator connected to the secondary fuel conduit to vary the supply of said secondary fuel and having a movable controller so constructed and arranged that its movements are proportional to compensated air requirements of said secondary fuel at its different, controlled rates of flow; and an actuating member connecting said proportioning means to operate said controller, said proportioning means being constructed and arranged to transmit movements of said movable element to said controller in such manner that deficiencies in the primary fuel flow will be made up by movements transmitted by the proportioning means.

3. Apparatus, as set forth in claim 1, wherein the manually settable control means comprises a hydraulic regulator having a manually movable spring loading cam.

4. Apparatus, as set forth in claim 1, wherein the manually settable control means comprises a jet pipe regulator having a manually movable loading cam of adjustable contour, the contour of the cam being so shaped that it takes into account air infiltration into the furnace.

5. Apparatus, as set forth in claim 1, wherein the flow responsive means also includes a jet pipe responsive device subject to changes in the primary fuel flow and connected to operate said servo-motor, and the member operable by the servo-motor is a a spring loading cam of adjustable contour.

6. Apparatus, as set forth in claim 2, wherein the regulators and the flow responsive device are of the hydraulic type having movable spring loading cams, and said proportioning means comprises differential gearing to proportion the flow of the secondary fuel relative to that of the primary fuel.

7. Apparatus, as set forth in claim 2, wherein the manually movable adjusting member has an associated indicator reading in terms of the adjusted total controlled supply of air.

8. Apparatus, as set forth in claim 2, wherein each of the regulators is provided with ratio varying means.

HERBERT ZIEBOLZ.